United States Patent [19]
Hudson et al.

[11] 3,885,426
[45] May 27, 1975

[54] TORQUE SENSING SYSTEM

[75] Inventors: Ray E. Hudson, Poway; John W. Knowlton, Laguna Beach, both of Calif.

[73] Assignee: Martin-Decker Company, Santa Ana, Calif.

[22] Filed: Apr. 30, 1973

[21] Appl. No.: 355,697

[52] U.S. Cl. .............................................. 73/136 R
[51] Int. Cl. .............................................. G01l 3/14
[58] Field of Search ................................. 73/136 R

[56] References Cited
UNITED STATES PATENTS

| | | | |
|---|---|---|---|
| 2,297,644 | 9/1942 | Angst | 73/136 R |
| 2,623,385 | 12/1952 | Jamieson | 73/136 R |
| 3,417,611 | 12/1968 | Dean et al. | 73/136 R |

Primary Examiner—James J. Gill
Attorney, Agent, or Firm—Lyon & Lyon

[57] ABSTRACT

A system for sensing the torque imparted by a rotary table to a drilling shaft in a rotary drilling operation. A rotary table is slidably positioned on the frame of a drilling rig. Sensors are positioned to register the reaction forces to the torque imparted to the drilling shaft by the rotary table. These sensors further act to prevent rotation of the slidably mounted rotary table. Mechanical linkage is also provided to prevent lateral movement of the rotary table without interfering with the measurement of reaction torque. A hydraulic totalizer is used with hydraulic load cells to provide the torque sensing system.

6 Claims, 4 Drawing Figures

PATENTED MAY 27 1975 3,885,426

SHEET 2

TORQUE SENSING SYSTEM

The present invention relates to the measurement of torque necessary to turn a drilling shaft during a drilling operation. More specifically, the invention is directed to means for measuring the reaction torque on a slidably mounted rotary table in a drilling rig.

In rotary drilling operations and specifically in oil drilling operations, it is very useful to know the amount of torque necessary to drive the shaft or Kelly. The quantity of torque necessary to drive the Kelly provides one indication of the type of material being penetrated and the sharpness of the bit. Several methods have been employed to measure this torque. These methods have not been found highly practical and accurate in all situations. One such method provides for the measurement of tension in the drive chain of a rotary table which is fixed to the frame of the rig. Such chain measuring devices are hard to keep in calibration and wear out rapidly. Another system employed measures directly the stress in the rotary shaft and does not involve the rotary table.

The present invention avoids devices measuring the tension in the chain or the stress in the shaft. The system of the present invention includes a slidably mounted rotary table which is not constrained from horizontal movement by the frame of the rig. Force sensing units are positioned advantageously about the slidably mounted rotary table to measure the torque input to the rotary shaft and constrain the rotary table to remain in a relatively fixed position. Thus, the measuring system is not in the way and is not subjected to conditions leading to high wear and failure.

Accordingly, an object of the present invention is to provide a torque measuring system which measures the reaction forces on rotary tables.

A second object of the present invention is to provide a system for measuring the torque on a rotary shaft using a slidably mounted rotary table.

A third object of the present invention is to provide a force sensing system which measures the reaction forces on a rotary table and also constrains the horizontal movement of the rotary table.

Another object of the present invention is to provide linkage for preventing substantial horizontal movement in a slidably mounted rotary table for a rotary drilling operation without affecting the measurement of resulting forces on the rotary table.

A further object of the present invention is to provide a system for measuring the resulting forces on a rotary table used in a rotary drilling operation which includes two hydraulic pressure sensing units and a hydraulic totalizer.

Thus, a system is provided for measuring the resulting forces on a slidably mounted rotary table to calculate the working torque on a rotary drilling shaft or Kelly. Other objects and advantages of the present invention will be made readily apparent from the following detailed description and accompanying drawings.

Figure 1:
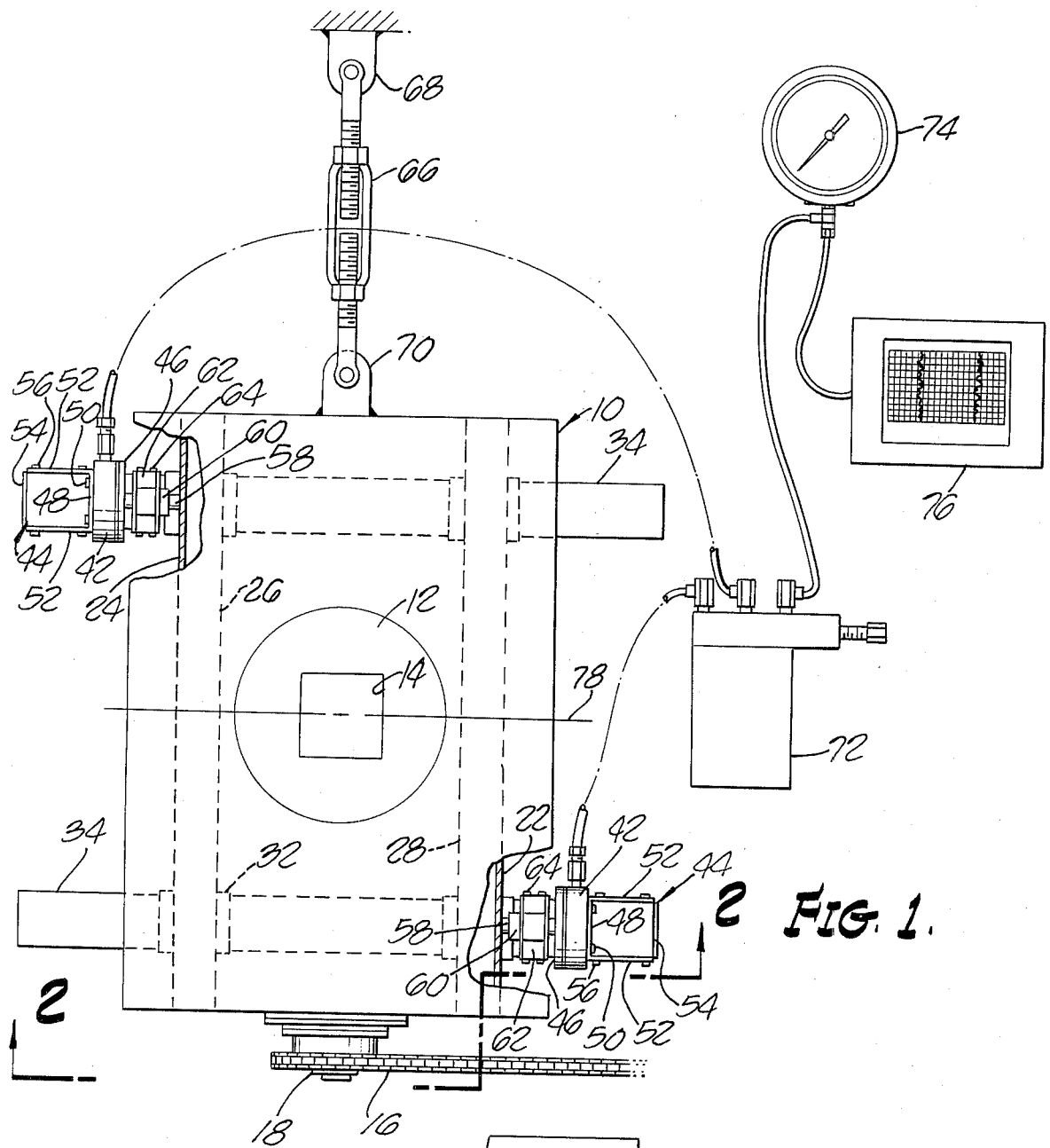
FIG. 1 is a top view of the present invention including the hydraulic system associated therewith.

Turning specifically to the drawings, a rotary table generally designated 10 is shown. The rotary table 10 may be a conventional rotary table used for oil drilling. The table disclosed in the drawings is of rectangular plan having a Kelly bushing 12 and a Kelly drive 14 centrally located therein. The input power to the rotary table is provided by a chain 16 which drives a sprocket wheel 18. The table is supported by a lower base section 20 which is of reduced width. Vertical sides 22 and 24 extend upward to support the table 10. The lower base portion 20 of the rotary table 10 further includes base support plates 26 and 28. These base support plates 26 and 28 extend across the width of the table 10. Polished stainless steel bearing plates 30 are positioned beneath the four corners of the table 10 and are welded to the base support plates 26 and 28. The polished stainless steel bearing plates 30 are used because of their comparative hardness and resistence to corrosion which help retain a smooth surface even after substantial use.

The rotary table 10 is supported on the rig structure on the polished stainless steel bearing plates 30. Low friction slide plates 32 are positioned on the main rotary beams 34 to cooperate with the bearing plates 30. The low friction slide plates 32 and the main rotary beams 34 form a structural base for the rotary table 10. The low friction slide plates 32 are employed with the polished stainless steel bearing plates 30 to give low friction support surfaces which are capable of supporting the high casing loads in the slips without damage to the support surfaces. One make of low friction slide plates which may be used for the present embodiment is sold under the trademark Fluorogold owned by the Fluorocarbon Co. The slide plates 32 may be welded to the rotary beams 34 or they may be bolted as shown in the drawings to the rotary beams 34 by using brackets 36. These brackets 36 extend downward about the main rotary support beams 34. Fasteners 38 are positioned through holes in the brackets 36 and are threaded into anchoring bars 40 which are welded to the main rotary beams 34. The brackets 36 and fasteners 38 are intended to hold the slide plates 32 on the main rotary beams 34. The brackets are not intended to support the downward loadings imposed on the rotary table 10. Consequently, the brackets 36 and slide plates 32 are in juxtaposition with the top surface of the main rotary beams 34 to prevent excessive loading of the brackets 36. Thus, the entire rotary table 10 is slidably supported on the main rotary beams. The rotary beams 34 and the brackets 36 do not prevent lateral movement of the rotary table 10.

Means are used for sensing the forces exerted horizontally on the rotary table 10. These sensing means may be provided by hydraulic load cells 42. The hydraulic load cells 42 are mounted on load cell mounting bases 44 which are in turn located on the main rotary beams 34. The load cells 42 are oriented on the load cell mounting bases 44 so that the face of each piston 46 on the load cells 42 will be parallel to the vertical sides 22 and 24 of the base portion 20 of the rotary table 10. Consequently, the mounting bases 44 have vertical mounting plates 48. The vertical mounting plates 48 are fastened to the hydraulic load cells 42 by fasteners 50. Side members 52 support the vertical mounting plate 48. A base structure is formed by plate 54 which extends between the side members 52. This base structure may be positioned on the rotary beams 34 and fastened to the anchoring bars 40 with fasteners 56.

Figure 4:
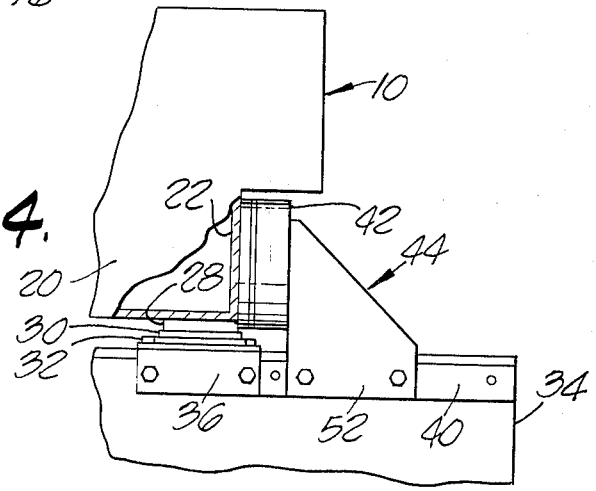
FIG. 4 illustrates the placement of a sensing unit without the optional push rod spacing element.
Figure 2:
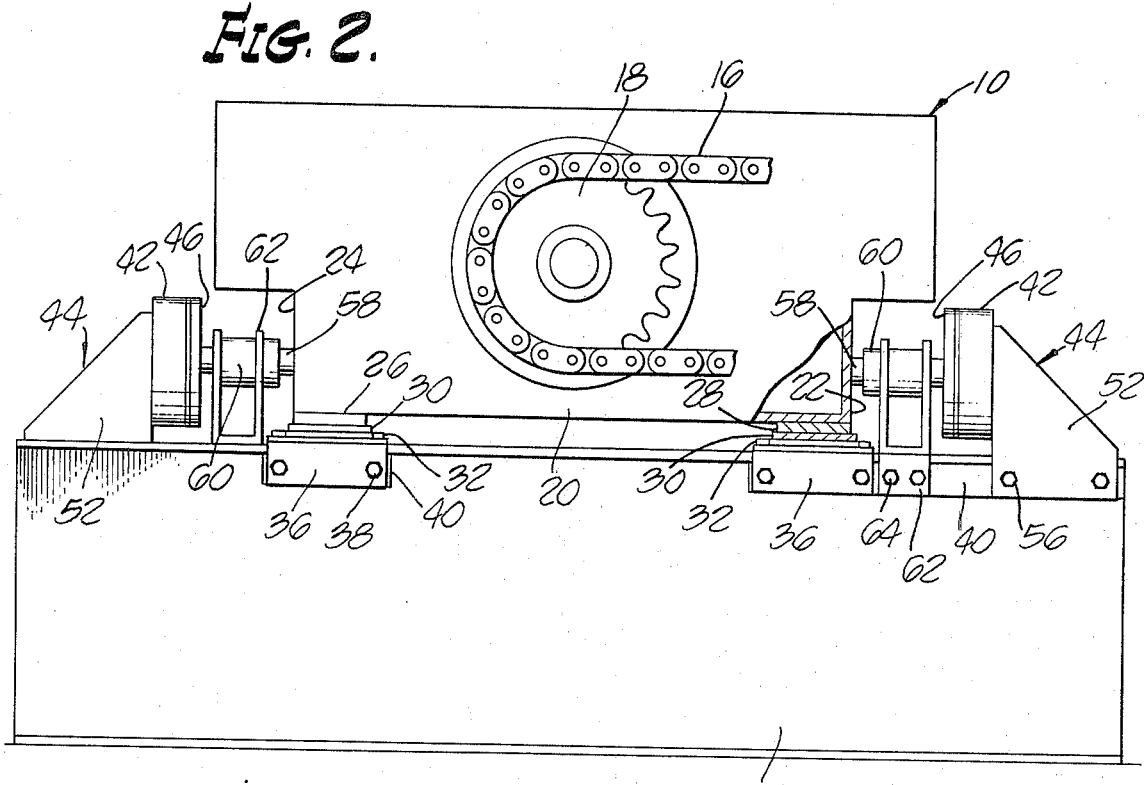
FIG. 2 is a side view of the present invention taken along line 2—2 of FIG. 1 illustrating the placement of the sensing units.
Figure 3:
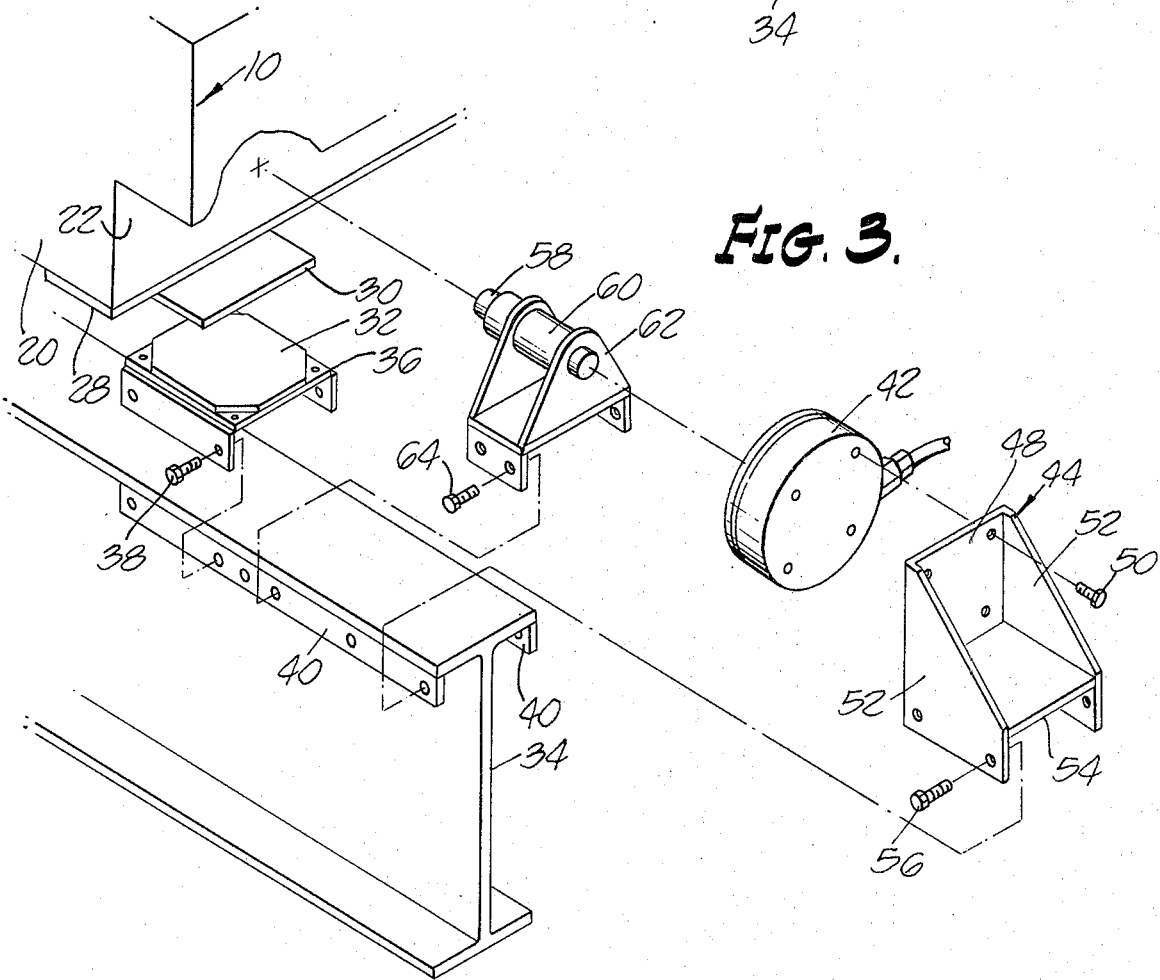
FIG. 3 is an exploded perspective view detailing the various components of one sensing unit and rotary table mount.

Two hydraulic load cells 42 are employed in the present configuration. These load cells 42 are positioned on opposite sides of the rotary table 10 and are further at opposite ends of the rotary table 10 as well. In this manner, a force couple may be formed resisting the reaction forces on the table 10. Turning specifically to FIG. 1, the two hydraulic load cells 42 are shown positioned at opposite corners of the rotary table 10 to resist the reaction forces caused by driving a Kelly in a clockwise direction. It is also shown in FIG. 1 that the load cells 42 to the right of the rotary table 10 also must resist the force created by the tension in the drive chain 16. Naturally, if the Kelly was to be driven in a counterclockwise direction and the torque was to be monitored, the load cells 42 would be positioned on the opposite sides of the table 10. Further, the chain 16 would either be set on the other end of the rotary table 10 or would be directed from the left onto the sprocket wheel 18. The hydraulic load cells 42 are shown spaced from the two vertical sides 22 and 24 of the rotary table 10 with push rods 58 and guides 60 actuating the pistons 46 across the distance. The push rods 58 and guides 60 are employed to protect the hydraulic load cells 42 during installation and removal of the rotary table 10. The push rods 58 are caused to move axially within the guides 60 to transmit the slight movements of the rotary table 10 which activates the hydraulic load cells 42. The guide members 60 are held by brackets 62 which are mounted to the rotary beams 34 by fasteners 64. As can be seen in FIG. 4, the load cells 42 may be positioned immediately adjacent the sides of the rotary table 10.

At the same time the load cells 42 act to measure the forces exerted horizontally on the rotary table 10, the hydraulic load cells 42 act to prevent substantial rotation of the rotary table 10 on the main rotary beams 34. Because the Kelly is normally driven in one direction when drilling and because the drive chain 16 is under constant tension, the load cells 42 provide most of the necessary restraining force to maintain the rotary table 10 in position. To prevent movement parallel to the faces of the pistons 46, a lateral support means is provided. This lateral support means is illustrated in FIG. 1 as a turnbuckle 66 pivotally attached to two clevis plates 68 and 70. The clevis plate 68 is welded to the frame of the rig and the clevis plate 70 is welded to the rotary table 10. By pivotally mounting the turnbuckle 66 perpendicular to the direction of motion actuating the hydraulic load cells 42, the turnbuckle 66 will only minimally affect the resulting forces experienced by the load cells 42. However, the turnbuckle 66 will provide rigid restraints against the lateral movement of the rotary table 10. Where it is anticipated that the Kelly will be driven in a reverse direction, stops may be positioned opposite the hydraulic load cells 42 on each of the main rotary beams 34. These stops may be of a form similar to the load cell mounting bases 44. These stops should be spaced from the opposite load cells 42 on the same main rotary beam 34 so that the stops will not force the rotary table 10 against the hydraulic load cell 42. Thus, all possible horizontal motion of the slidably mounted rotary table 10 can be prevented through the use of the turnbuckle 66, the load cells 42 and stops. The load cells 42 thereby provide a dual function in that they measure the resulting forces on the rotary table 10 and further act to constrain horizontal movement of the rotary table 10.

The hydraulic load cells 42 are hydraulically coupled with a hydraulic totalizer 72. The hydraulic totalizer 72 operates to take the average of the pressures from the load cells 42. This pressure average may be read out on the gauge 74 and on a hydraulic recorder or transducer and electric recorder 76.

The torque on the rotary drilling shaft may be directly calibrated onto the gauge 74. This is possible because the gauge pressure is directly proportional to the drive torque on the rotary drilling shaft. To calibrate the gauge, the following system may be employed. First, the rotary brake is set to allow sustenance of tension in the chain drive 16. The rotary table 10 is unlocked so that tension can be built on the chain 16. The drilling string is then suspended in the Kelly-down position with the Kelly drive bushing 12 in place and very little or no external weight acting directly on the rotary table 10. A standard tong torque unit is then installed on a break-out tong. A come-a-long (or similar system) is next used to anchor the pull line at the V-door side of the rig floor with the break-out tong on the Kelly box. A torque of about 24,000 ft.-lbs. is then placed on the string through the tong handle. This gauge 74 may then be calibrated to read 24,000 ft.-lbs. This operation is accomplished with the chain 16 in place on the sprocket 18. Thus, the tension in the chain under the 24,000 ft.-lbs. of torque is automatically included. Calibration of the unit must be done any time the sprocket wheel 18 is changed or the dimensions of the unit and the placement of the sensors is otherwise altered.

Theoretical calculations may be made to determine the pressures which will be experienced by the load cells 42 and the gauge 74 in the present system. The total pressure in the load cell 42 nearest the sprocket wheel 18 (cell A) is:

$$Ap = A_1 + A_2/S$$

where
$A_1$ = reaction load at the cell A,
$A_2$ = chain load at cell A,
$S$ = active size of the cell piston.

The reaction load is:

$$A_1 = T/x + y$$

where
$T$ = estimated maximum torque applied to the rotary,
$x$ = distance from the centerline 78 of the table 10 to the centerline of the push rod 58 at cell B (furthest cell 42 from the sprocket wheel 18),
$y$ = distance from the centerline 78 to the centerline of the push rod 58 at cell A.

The chain load is:

$$A_2 = T(w + x)/NR(x + y)$$

where
$N$ = rotary table gear ratio,
$R$ = sprocket pitch radius,
$W$ = horizontal distance from centerline 78 to sprocket wheel 18.

Similarly for cell B:

$$B_p = B_1 + B_2/S$$
$$B_1 = T/x + y$$
$$B_2 = T(w - y)/NR(x + y)$$

The full gauge pressure ($D_p$) through the totalizer 72 is:

$$D_p = Ap + Bp/2$$

Thus, a system is disclosed which uses a slidably mounted rotary table and load cells positioned about the rotary table to resist the reaction loads developed in driving the rotary drilling shaft or Kelly. The system provides an accurate and continuous direct reading of the torque on the drilling shaft and does not require repeated calibrations unless the system is altered. Further, the system remains away from the working area and is not subjected to the various conditions which create high wear and frequent failure in other such systems.

While embodiments and applications of this invention have been shown and described, it would be apparent to those skilled in the art that many more modifications are possible without departing from the inventive concepts herein described. The invention, therefore, is not to be restricted except as is necessary by the prior art and by the spirit of the appended claims.

In the claims:

1. A torque sensing system on a drilling rig for a rotary drilling shaft driven by a rotary table, comprising
    means for slidably mounting the rotary table on the drilling rig;
    sensing means fixed to the drilling rig for measuring forces tending to rotate the rotary table on said slidable mounting means, said sensing means being capable of providing a force couple to resist rotation of the rotary table; and
    means for preventing lateral movement of the rotary table without significantly affecting the resulting forces measured by said sensing means, said means for preventing lateral movement including a rigid link pivotally mounted at one end to said rotary table and at the other end to the drilling rig, said link being perpendicular to the directions in which said sensing means provide the force couple to resist rotation of the rotary table.

2. The device of claim 1 wherein said sensing means is oriented to resist loads of the rotary table drive.

3. The device of claim 1 wherein said sensing means includes
    two hydraulic load cells;
    a hydraulic totalizer operably connected to said hydraulic load cells; and
    means for reading the output of said hydraulic totalizer.

4. The device of claim 3 wherein said means for reading the output of said hydraulic totalizer is calibrated directly into torque on the rotary drilling shaft.

5. A torque sensing system for a rotary drilling shaft driven by a rotary table on a drilling rig, comprising
    a first load cell fixed to the drilling rig;
    a second load cell fixed to the drilling rig, said first and said second load cells being positioned about the rotary table to resist rotation of the rotary table about a vertical axis;
    means for measuring the resistive forces provided by said first and said second load cells; and
    means for preventing lateral movement of the rotary table without significantly affecting the resulting forces measured by said load cells, said means including a rigid link pivotally mounted at one end to the rotary table and at the other end to the drilling rig, said link being perpendicular to the directions in which said load cells provide the force couple to resist rotation of the rotary table.

6. A torque sensing system for a rotary drilling shaft driven by a chain driven rotary table on a drilling rig, comprising
    mounts for supporting the rotary table, said mounts allowing free horizontal movement of the drilling table;
    a first hydraulic load cell fixed to the drilling rig;
    a second hydraulic load cell fixed to the drilling rig, said first and said second hydraulic load cells being positioned about said rotary table to resist rotation of said rotary table on the drilling rig and being positioned to measure forces tending to rotate said rotary table, said first hydraulic load cell also being positioned to resist the tension load of the chain;
    means for measuring the resistive forces provided by said first and said second load cells; and
    a rigid link pivotally mounted at one end to said rotary table and at the other end to the drilling rig, said link being perpendicular to the directions in which said load cells provide resistive forces.

* * * * *